J. O. FISHER.
APPARATUS FOR INJECTING FUEL INTO COMBUSTION CHAMBERS.
APPLICATION FILED DEC. 2, 1918.
1,333,612.
Patented Mar. 16, 1920.
3 SHEETS—SHEET 3.
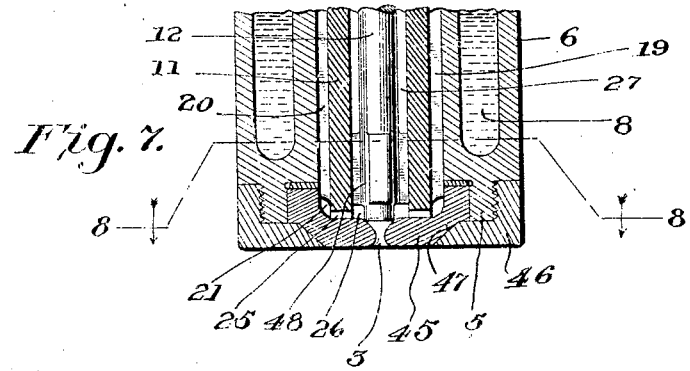
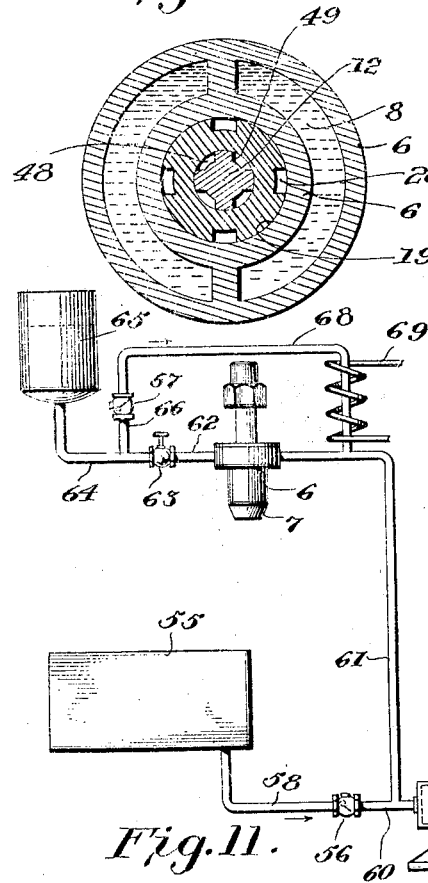
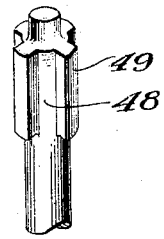
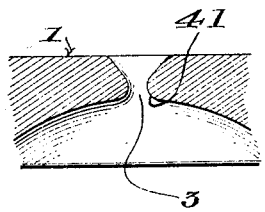
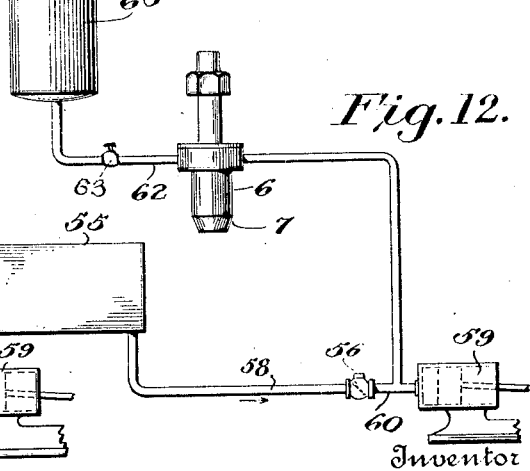
Inventor
Joseph O. Fisher
By
Attorney
Witness

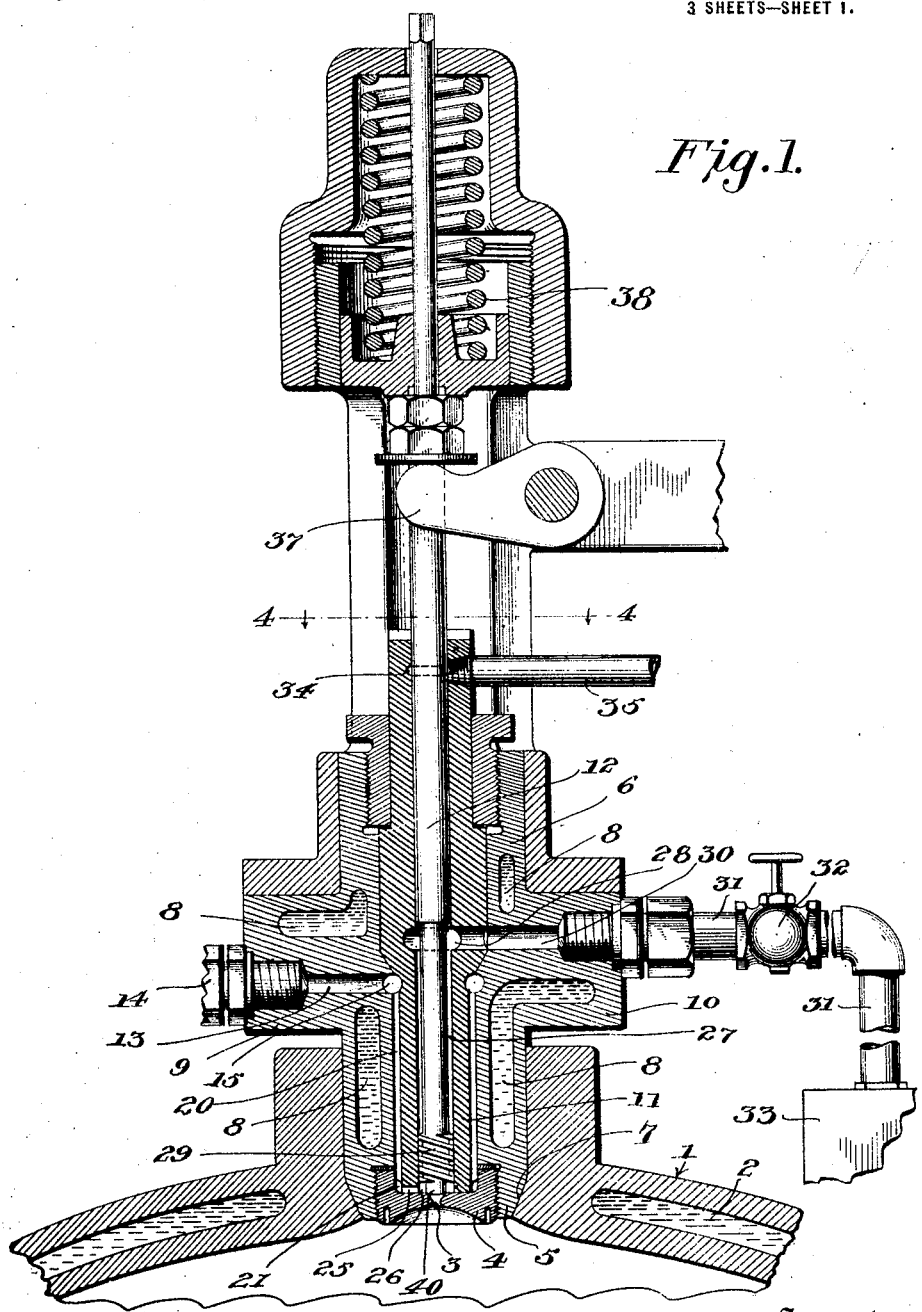

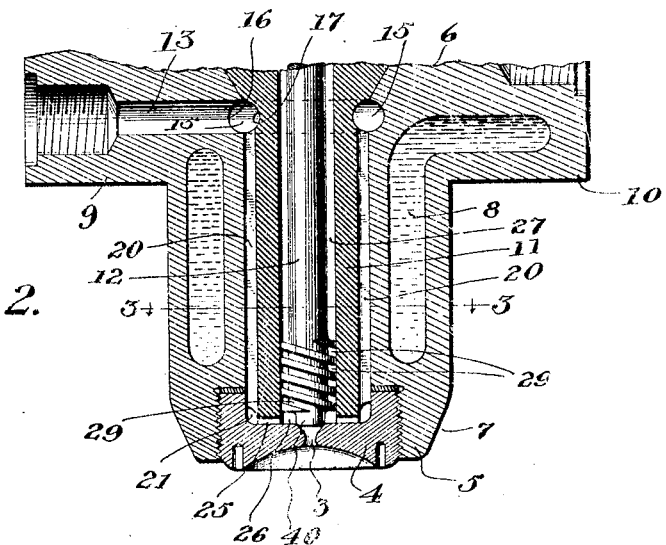
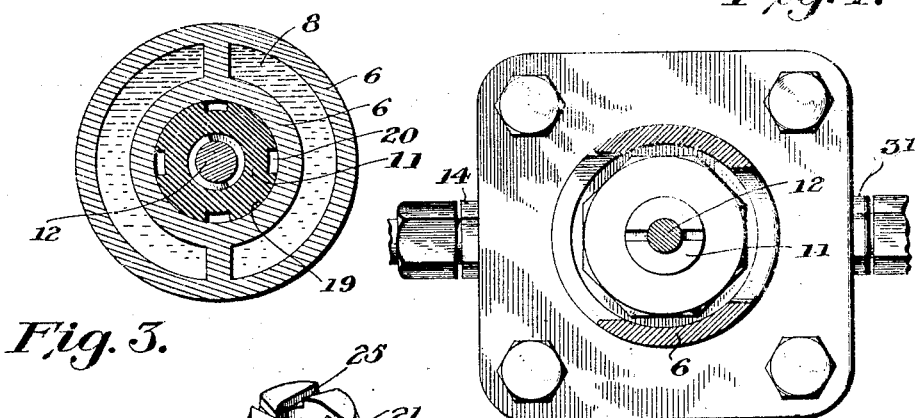
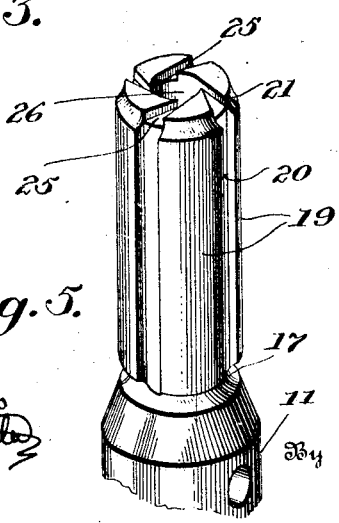

UNITED STATES PATENT OFFICE.

JOSEPH O. FISHER, OF WASHINGTON, DISTRICT OF COLUMBIA.

APPARATUS FOR INJECTING FUEL INTO COMBUSTION-CHAMBERS.

1,333,612.     Specification of Letters Patent.     Patented Mar. 16, 1920.

Application filed December 2, 1918. Serial No. 265,041.

*To all whom it may concern:*

Be it known that I, JOSEPH O. FISHER, a citizen of the United States, residing at Washington, in the District of Columbia, have invented certain new and useful Improvements in Apparatus for Injecting Fuel into Combustion-Chambers; and I do hereby declare the following to be a full, clear, and exact description of the invention, such as will enable others skilled in the art to which it appertains to make and use the same.

This invention relates to an apparatus for injecting fuel into combustion chambers, and has for its object to improve the mechanism disclosed in my prior Patent #1,252,254, dated January 1, 1918, and entitled Method of and apparatus for injecting fuel into combustion chambers.

With this and other objects in view the invention consists in the novel details of construction and combinations of parts more fully hereinafter disclosed and particularly pointed out in the claims.

Referring to the accompanying drawings forming a part of this specification in which like numerals designate like parts in all the views:—

Figure 1 is a longitudinal sectional view of an injector made in accordance with this invention;

Fig. 2 is an enlarged sectional detail view of the lower portion of the injector mechanism detached from the engine cylinder;

Fig. 3 is a sectional view taken on the line 3—3 of Fig. 2 looking in the direction of the arrows;

Fig. 4 is a sectional view taken on the line 4—4 of Fig. 1 looking in the direction of the arrows;

Fig. 5 is a detail perspective view of the sleeve portion of the injector mechanism detached from the nozzle;

Fig. 6 is a plan view of the delivery portion of the sleeve shown in Fig. 5;

Fig. 7 is an enlarged detail sectional view of the lower portion of a modified form of injector mechanism;

Fig. 8 is a sectional view taken on the line 8—8 of Fig. 7 looking in the direction of the arrows;

Fig. 9 is a perspective view of the lower end portion of the valve and its stem detached from the mechanism shown in Fig. 7;

Fig. 10 is an enlarged detail sectional view illustrating the shape of the port 3 shown in Fig. 2 and elsewhere;

Fig. 11 is a diagrammatic view showing one form of fuel circuit which is suitable for this apparatus; and Fig. 12 is a diagrammatic view showing another form of fuel circuit suitable for this apparatus.

1 indicates any suitable combustion chamber such for example as the cylinder of an internal combustion engine, 2 a water jacketed space, 3 a port leading into the cylinder 1, 4 a plug carrying the port 3 screw threaded or otherwise secured in the lower end 5 of the nozzle member 6, all as will be clear from the drawings.

The said nozzle member is preferably tapered at its lower end as indicated at 7 to fit a correspondingly shaped opening in the cylinder 1, is provided with the water jacketed spaces 8, with the extensions 9 and 10, and with a central bore as indicated. Fitting said central bore of nozzle 6, is the sleeve like member 11, itself provided with a central bore in which is located the valve stem or rod like member 12.

The extension 10 is provided with a passage 13 with which registers the inlet pipe 14.

The bore of the nozzle 6, as well as the sleeve like member 11, are cut away as shown in Figs. 2 and 5, as at the points 16 and 17 respectively, to form the annular passage 15, with which said passage 13 connects. Said sleeve 11 is further provided with the longitudinally disposed ribs 19, leaving channels 20 between them, which connect said annular passage or chamber 15, with a second annular chamber 21, formed by the cutaway lower ends of said ribs 19 and the interior surface of the hollowed out plug member 4. Leading across the extreme lower end of the sleeve, are the tangentially disposed passages 25 which connect said chamber 21 with the interior bore, or chamber 26, with which said sleeve 11 is provided.

The said valve stem or rod like member 12 is cutaway as illustrated to provide the annular passage 27, connecting the annular chamber 28 with the helically disposed passages 29 with which said stem is provided. Said passages 29 lead from said chamber 26, and said annular chamber 28 connects with the passage 30, leading into the pipe 31 which is provided with the hand operated valve 32, and which joins the tank 33 as shown.

The main portion of stem 12 above chamber 28 fits the bore of sleeve 11 as shown, but fuel oil is liable to leak past said chamber to a greater or less extent, and therefore there is provided the annular chamber 34 to catch said oil, and a pipe such as 35 may be provided to carry it away if desired. The valve stem 12 may be automatically raised and lowered by any suitable mechanism such as the lever 37, spring 38, and associated parts.

The extreme lower end 40 of the valve stem is slightly rounded and made to accurately fit the outer flared portion 41 of the walls of the port 3, as will be best understood from a reference to Figs. 2 and 10, so that when the valve is unseated the port is immediately opened and the oil with a minimum of friction passed down into the cylinder as will appear more fully below.

That is to say, it is an important feature of this invention that all of the edges, such as those of the valve 40, the port 3, etc., are not only rounded off, but are highly polished, which serves to reduce very greatly the friction which would otherwise be encountered, and therefore such polishing and rounding off of the parts serves to prevent the velocity of the fuel entering the cylinder from being decreased. The maintaining of a relatively high velocity of the fuel entering the cylinder, due to this rounding off and polishing of the parts, produces a better spray inside the cylinder, and therefore a more thorough mixing of the fuel and air, with the result that better combustion effects are experienced.

Stated in other language, the rounded surfaces in the aggregate contain a less area than do the square surfaces or those which have not been rounded, and this in itself is quite important in decreasing the friction of the fuel passing into the cylinder.

In addition to this, should the end 40 of the spindle 12 be left square, or should it have sharp corners, the effect is to deliver the spray unsymmetrically and in an irregular manner into the cylinder, and therefore the combustion is not as uniform as would otherwise be the case.

The operation of the invention so far disclosed is as follows:—

Fuel may enter through the pipe 14, Fig. 1, pass along the passage 13 into the annular chamber 15, out of said chamber 15 through the straight passages 20, out of said passages into the annular chamber 21, from said chamber 21 through the tangentially disposed passages 25, which passages are tapered as shown, thus greatly increasing the velocity of the fuel, and from said passages 25 into the chamber 26, where the fuel has attained a very high velocity.

By placing the grooves or passages 25 in a plane perpendicular to the axis of the sleeve 11, the following advantages are attained.

The motion of the fuel as it enters the chamber 26 is in a plane perpendicular to the axes of the sleeve 11 and spindle or stem 12, and also perpendicular to the axis of the port 3. Consequently after a steady flow of fuel through said chamber 26 has been established, there is little or no tendency for the fuel to change its flow through said port 3 or through said spiral passages 29, except as it may be forced to take one direction or the other by reason of one passage or the other being partially opened or closed.

In other words, there is no tendency for the fuel to flow either up or down as a result of its rotational velocity, but it will take an up or down motion purely as a result of the easily regulated pressure which is behind it, and the easily regulated resistance which is in front of it. This constitutes one of the important advantages of this system over that disclosed in my said prior patent.

That is to say, a great advantage that is derived from the arrangement of parts just disclosed, and the disposition of the rotating fuel in a plane perpendicular to the axis of the port 3, resides in the fact that an absolute control of the motion of fuel fed through said port 3 can be had by merely regulating the pressure of the fuel in the chamber 26. In other words, it is comparatively easy to control the pressure in the chamber 26 by merely controlling the pressure in the passages 20 and 13. In other words, the pressure in the chamber 26 can be easily controlled by a hand operated valve placed in either of the pipes 14 or 31. I have illustrated such a valve 32 in Fig. 1.

The pressure of the fuel being thus regulated in the chamber 26, and the valve 40 being opened to a predetermined extent, the amount of fuel corresponding to said pressure and to the position of said valve will at once pass through said port 3 into the combustion chamber, while the remainder of the fuel will pass along the spirally disposed passages 29 into the annular chamber 27, from said chamber into the annular chamber 28, and from said last mentioned chamber into the passage 30, pipe 31, past valve 32, and into the tank 33 or other place which may be provided for the unconsumed fuel.

In the somewhat modified form of nozzle illustrated in Fig. 7, instead of screw threading the plug 4 into the lower end 5 of the nozzle 6, I prefer to fit the plug 45 into said lower end 5 of the nozzle 6, to omit the tapered portion 7 of said nozzle, and to screw thread on the exterior of said nozzle a cap 46, provided with an inclined beveled shoulder 47 which holds said plug 45 in place as shown. Further, instead of providing the lower end 40 of the valve stem 12 with the spirally disposed passages 29, as in Figs. 1 and 2, I provide said lower end with the straight passages 48, which are formed between the straight lugs 49, which in turn closely fit the interior bore of the sleeve 11, all as will be readily understood. Otherwise the construction of the parts shown in Fig. 7 are or may be the same as the construction shown in Fig. 2.

In this modified form of construction the fuel passing down the outer straight passages 20 will enter the annular chamber 21, will pass through the tangentially disposed passages or slots 25 in the lower end of the sleeve 11, and enter chamber 26 as above disclosed. The said slots or passages 25 being in a plane perpendicular to the axis of the port 3 all rotational energy will be directed in said plane and toward getting up rotational velocity in the fuel without there being any substantial component of rotational energy directed along the axis of said port 3, all as above disclosed. That portion of the fuel which does not enter the cylinder through the port 3 under the pressure in the pipe system will therefore readily pass up through the straight passages 48, through the straight passages 27, and out the system in the manner above set forth.

In both the forms of invention just described there is a decided advantage in introducing the fuel from the outside of the chamber 26, and having it pass up on the inside of the sleeve 11. When the fuel attains its rotation in the chamber 26, it greatly increases in velocity until its center of motion is reached, and it enters the port 3 under its highest velocity. On the other hand, when it ascends the passages 29 or 48 as the case may be, it is the outer portion of the whirling mass which reaches said passages, and which therefore has a less velocity of rotation than has the central portion thereof. Stated in other language, the very highly rotating mass immediately over the axis of port 3 enters said port not only with the very highest velocity but with the minimum of friction, while the less highly rotating mass ascends the passages 29 or 48 without in the least interfering with the efficiency of this injecting action.

In addition to the above, the water jacketing of the lower end 5 of the nozzle 6 immediately in the neighborhood of the port 3, as well as the water jacketing of the cylinder 1, in this particular region, enables the operator to control to a much better degree than has been heretofore proposed, the temperature of the fuel in the chamber 26. He thus is enabled to prevent the fuel from being raised to such a temperature that carbonization is liable to take place.

Coming now to Fig. 11, a form of fuel circuit is illustrated which is suitable for either of the forms of nozzle shown in Figs. 1 or 7. In said Fig. 11, 55 represents any suitable fuel tank, 56 a check valve, 58 a pipe leading from said tank to said check valve, 59 a pump, and 60 a pipe joining said check valve and pump. 61 represents a pipe joining the pipe 60 with the injector nozzle 6 which may be of either of the above mentioned forms, and 62 a pipe leading from said injector nozzle to the hand operated valve 63. From the valve 63 leads a pipe 64 to the closed tank 65 adapted to receive fuel, and to compress the air in the top thereof. From the pipe 64 leads the pipe 66 to the check valve 67, and from the check valve 67 leads the pipe 68 back to the pipe 61 as shown. 69 represents any suitable heating or cooling coil.

The operation of the circuit just disclosed is as follows:—

When the pump 59 makes a suction stroke, fuel is sucked into said pump past the valve 56, and when said pump makes a compression stroke said fuel is forced through the pipe 61 into the nozzle 6, and a portion of the fuel is injected into the combustion chamber in the manner disclosed above. The amount of pressure in the chamber 26 of the nozzle 6 is regulated by the hand operated valve 63. The unconsumed fuel passes through said nozzle 6, through the pipe 62, past the valve 63, through the pipe 64, and into the tank 65, where the air trapped therein will be compressed. Upon the next suction stroke of the pump, the air in tank 65 will expand, thus forcing a portion of the fuel back through the pipes 64 and 62, and into the nozzle 6, while another portion of the fuel owing to the resistance past valve 63 and nozzle 6 will be forced past the valve 67 through the pipe 68 and back into the pipe 61 to be later returned to the nozzle 6.

It will thus be seen that in the form of circuit just disclosed, by regulating the hand operated valve 63 the pressure can be made anything desired in the chamber 26. In a modified form of circuit shown in Fig. 12, the parts are the same as those just described in connection with Fig. 11, except the shunting circuit 66, 67 and 68 is omitted, but not the hand operated valve. In this case the pump 59 will circulate the fuel continuously backward and forward through the chamber 26.

From the foregoing it will be seen that the tapered tangentially disposed passages 25 and their associated parts constitute a means for imparting a continuous rotary motion to the fuel in a predetermined plane outside the cylinder 1, that the pump 59, air tank 65 and valve 63, or the friction of the passages, constitute a means for controlling the regulated pressure on said fuel, and that when the valve 40 is lifted to different degrees this pressure will cause different quantities of fuel to pass through the port 3.

It is obvious that those skilled in the art may vary the details of construction as well as the arrangement of parts, without departing from the spirit of the invention, and therefore I do not wish to be limited to the above disclosure except as may be required by the claims.

What I claim is:—

1. In an apparatus for injecting fuel into a combustion chamber, the combination of an outer nozzle casing provided with a fuel inlet port; means for supplying fuel to said casing; a sleeve member carried by said casing; means spacing said sleeve member from said casing to form an outer inlet passage for said fuel; a valve member for controlling said port located inside said sleeve member, and spaced from the latter to form a chamber for said fuel; passages located in a plane perpendicular to the axis of said port connecting said outer inlet passage and said chamber, said last named passages being disposed tangentially to said chamber; and means permitting the escape of fuel along the interior of said sleeve member, substantially as described.

2. In a nozzle for injecting fuel into a combustion chamber, the combination of an outer casing having a fuel inlet port and a central bore; a sleeve having a central bore provided with longitudinal grooves affording inlet passages for said fuel, and fitting said bore; a valve stem provided with a valve controlling said port, located in the bore of said sleeve and spaced therefrom to form a chamber for said fuel as well as an outlet passage therefor; and grooves carried by the lower end of said sleeve located in a plane perpendicular to the axis of said port, and tangentially disposed to said chamber, substantially as described.

3. In a nozzle for injecting fuel into a combustion chamber, the combination of an outer casing provided with a fuel inlet port; a valve controlling said port; a sleeve surrounding said valve, and having tangentially disposed tapered passages located in a plane perpendicular to the axis of said port, and forming a chamber in which the fuel may attain a high velocity of rotation; means located outside said sleeve for leading fuel to said chamber and port; and means located inside said sleeve for leading fuel away from said chamber, substantially as described.

4. In an apparatus for injecting fuel into a combustion chamber provided with a fuel inlet port, the combination of means for imparting to said fuel a rotatory motion in a plane substantially perpendicular to the axis of said port; means for imparting to the rotating fuel a pressure along the axis of said port; and means for readily controlling said pressure, substantially as described.

5. In an apparatus for injecting fuel into a combustion chamber provided with a fuel inlet port having rounded smooth surfaces, the combination of a valve having smooth rounded surfaces controlling said port; a sleeve provided with tangentially disposed grooves located in a plane substantially perpendicular to the axis of said port surrounding said valve and forming a chamber; means to cause the fuel to rotate in said last named chamber; means to impart a pressure on the rotating fuel; and a hand operated valve to control said pressure, substantially as described.

6. In a circuit for a fuel injecting system, the combination of a nozzle provided with a fuel inlet port; a tank for supplying the fuel; a pump connected to said tank; a connection between said pump and said nozzle; a second tank in which air may be trapped; a connection between said nozzle and said second tank; and a check valve in said first named connection between said first named tank and pump, substantially as described.

7. In a circuit for a fuel injecting system, the combination of a nozzle provided with a fuel inlet port; a tank for supplying the fuel; a pump; a connection provided with a check valve between said pump and said tank; a second connection between said first named connection and said nozzle; a second tank in which air may be trapped; a third connection between said nozzle and said second tank provided with a hand operated valve; and a fourth connection provided with a check valve joining said third and second connections, substantially as described.

8. In a circuit for a fuel injecting system, the combination of a nozzle provided with a fuel inlet port; a tank for supplying the fuel; a pump; a connection between said pump and tank; a connection between said first named connection and said nozzle; a second tank in which air may be trapped; a connection between said nozzle and said second tank; a hand operated valve in said last named connection for controlling the pressure in said nozzle; and a check valve in said first named connection between said first named tank and pump, substantially as described.

In testimony whereof I affix my signature.

JOSEPH O. FISHER.